United States Patent [19]
Ishige

[11] Patent Number: 6,033,227
[45] Date of Patent: Mar. 7, 2000

[54] TRAINING APPARATUS

[75] Inventor: Hiroyuki Ishige, Tokyo, Japan

[73] Assignee: NEC Corporation, Tokyo, Japan

[21] Appl. No.: 08/803,745

[22] Filed: Feb. 21, 1997

[30] Foreign Application Priority Data

Feb. 26, 1996 [JP] Japan .................................. 8-063689

[51] Int. Cl.⁷ .................................................. A63B 69/00
[52] U.S. Cl. .............................. 434/253; 434/247; 482/4; 482/71; 482/902
[58] Field of Search .................................... 434/247, 253; 482/1–9, 51–54, 57, 66, 69, 70, 71; 601/23

[56] References Cited

U.S. PATENT DOCUMENTS 5,049,079  9/1991  Furtado et al. .......................... 434/253
5,277,678  1/1994  Friedebach et al. ...................... 482/70

FOREIGN PATENT DOCUMENTS 07080096  3/1995  Japan .
07112071  5/1995  Japan .

*Primary Examiner*—Glenn E. Richman
*Attorney, Agent, or Firm*—Young & Thompson

[57] ABSTRACT

A training apparatus includes a training device, an operation detection unit, a training condition calculation unit, an image display processing unit, and a display unit. The training device has a movable unit which is displaced according to an action of a trainee who is training with reference to a training image. The operation detection unit detects a displacement of the movable unit during training. The training condition calculation unit calculates a training condition of next time on the basis of a detection result from the operation detection unit in training immediately before and a training condition immediately before. The image display processing unit prepares, on the basis of the training condition obtained by the training condition calculation unit, training image data which changes according to the detection result from the operation detection unit in training under the obtained training condition. The display unit displays the training image in accordance with the training image data prepared by the image display processing unit.

18 Claims, 9 Drawing Sheets

| SWING COUNT | VOLTAGE VALUE | | | | | |
|---|---|---|---|---|---|---|
| | DN | DN-1 | ...... | D2 | D1 | D0 |
| 1 | 0 | 0 | ...... | 0 | 0 | 0 |
| 2 | 0 | 0 | ...... | 0 | 0 | 0 |
| 3 | 0 | 0 | ...... | 0 | 1 | 1 |
| ⋮ | ⋮ | ⋮ | ...... | ⋮ | ⋮ | ⋮ |
| M-1 | 1 | 1 | ...... | 1 | 1 | 0 |
| M | 1 | 1 | ...... | 1 | 1 | 1 |

F I G. 5

TRAINING APPARATUS

BACKGROUND OF THE INVENTION

The present invention relates to a training apparatus having a display unit for displaying a training image which changes according to an action of a trainee and also having a training device whose movable unit is operated in accordance with the action of the trainee who is viewing the training image displayed on the display unit.

In recent years, training apparatuses with which a trainee trains with reference to a training image changing according to an action of the trainee have become popular.

FIG. 9 shows a conventional training apparatus of this type. This apparatus comprises a training device 90 having a movable unit 90a which moves according to an action of a trainee, an operation detection unit 91 consisting of, e.g., a rotary encoder for detecting the operation of the movable unit 90a of the training device 90, a load unit 92 for applying a load to the movable unit 90a of the training device 90, a control unit 93 for controlling the load unit 92, an input unit 94 connected to the control unit 93, an image information processing unit 95 for processing image information under the control of the control unit 93, and a display unit 96 for displaying an image information output from the image information processing unit 95.

To perform training using the conventional training apparatus, the trainee selects a desired course (e.g., beginner, intermediate, or advanced course) from a predetermined course menu by inputting selection data from the input unit 94.

When the course is selected by the trainee, the control unit 93 controls the load unit 92 such that a load according to the selected course is applied to the movable unit of the training device 90, and simultaneously, notifies the image information processing unit 95 of the selected course. The image information processing unit 95 notified of the course displays, on the display unit 96, the first image of the training image corresponding to the notified course.

When the trainee starts training, the action of the trainee is detected by the operation detection unit 91, and the detection result is sent to the control unit 93. The control unit 93 converts the detection result from the operation detection unit 91 into a format processable by the image information processing unit 95 and sends the data to the image information processing unit 95. The image information processing unit 95 changes the training image displayed on the display unit 96 in accordance with information from the control unit 93.

In the above-described conventional training apparatus, the training image is displayed on the display device in accordance with the course of trainee's choice, and at the same time, a load according to the selected course is applied to the movable unit 90a of the training device 90. For this reason, training cannot be performed in correspondence with the capacity for locomotion and technique of the trainee. Japanese Patent Laid-Open No. 7-112071 discloses a technique in which the weight of the trainee is measured, and the power of resistance to the operation system is increased/decreased or display contents displayed on the display unit are adjusted on the basis of the measurement result. In this prior art, however, the power of resistance is increased/decreased, or the display contents are adjusted only on the basis of the weight of the trainee. Even with this technique, training corresponding to the capacity for locomotion and technique of the trainee cannot be performed.

SUMMARY OF THE INVENTION

It is an object of the present invention to provide a training apparatus capable of performing training under training conditions suitable for the capacity for locomotion and technique of a trainee.

In order to achieve the above object, according to the present invention, there is provided a training apparatus comprising a training device having movable means which is displaced according to an action of a trainee who is training with reference to a training image, operation detection means for detecting a displacement of the movable means during training, training condition calculation means for calculating a training condition of next time on the basis of a detection result from the operation detection means in training immediately before and a training condition immediately before, image display processing means for preparing, on the basis of the training condition obtained by the training condition calculation means, training image data which changes according to the detection result from the operation detection means in training under the obtained training condition, and display means for displaying the training image in accordance with the training image data prepared by the image display processing means.

BRIEF DESCRIPTION OF THE DRAWINGS

FIG. 5 is a view showing the contents of a braking control information storage unit shown in FIG. 3;

DESCRIPTION OF THE PREFERRED EMBODIMENT

The present invention will be described below in detail with reference to the accompanying drawings.

Figure 1:
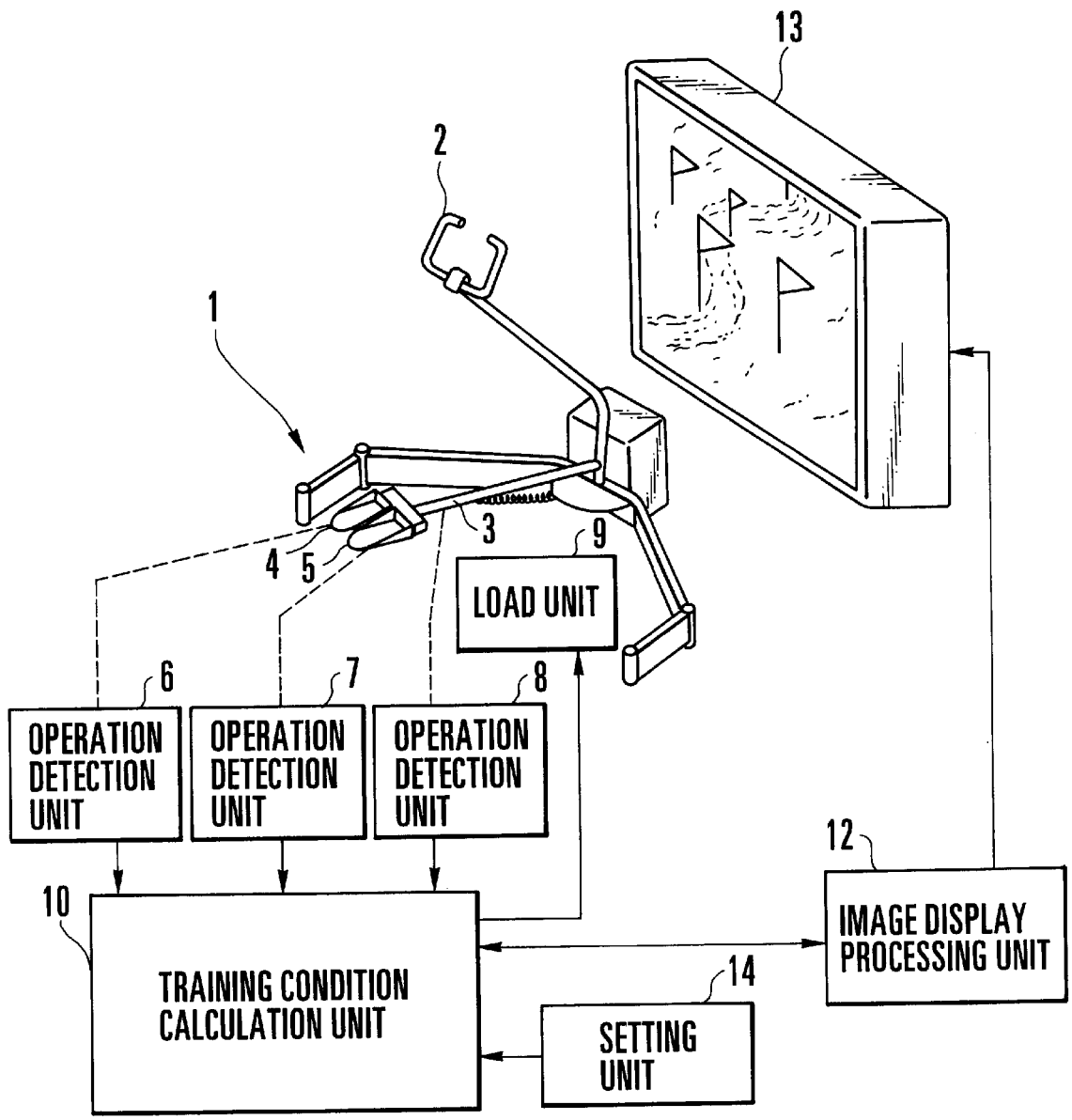
FIG. 1 is a block diagram showing a training apparatus according to an embodiment of the present invention.

FIG. 1 shows a training apparatus according to an embodiment of the present invention. The present invention is applied to a ski training apparatus.

The training apparatus of this embodiment comprises a training device 1 with which a trainee performs ski training, operation detection units 6 to 8 for detecting the operations of various portions of the training device 1, a load unit 9 for applying a load to the training device 1, a training condition calculation unit 10 for calculating training conditions for the training device 1, an image display processing unit 12 for performing image display processing on the basis of information from the training condition calculation unit 10, a display unit 13 for displaying an image information output from the image display processing unit 12, and a setting unit 14 for setting various data to the training condition calculation unit 10.

Figure 2:
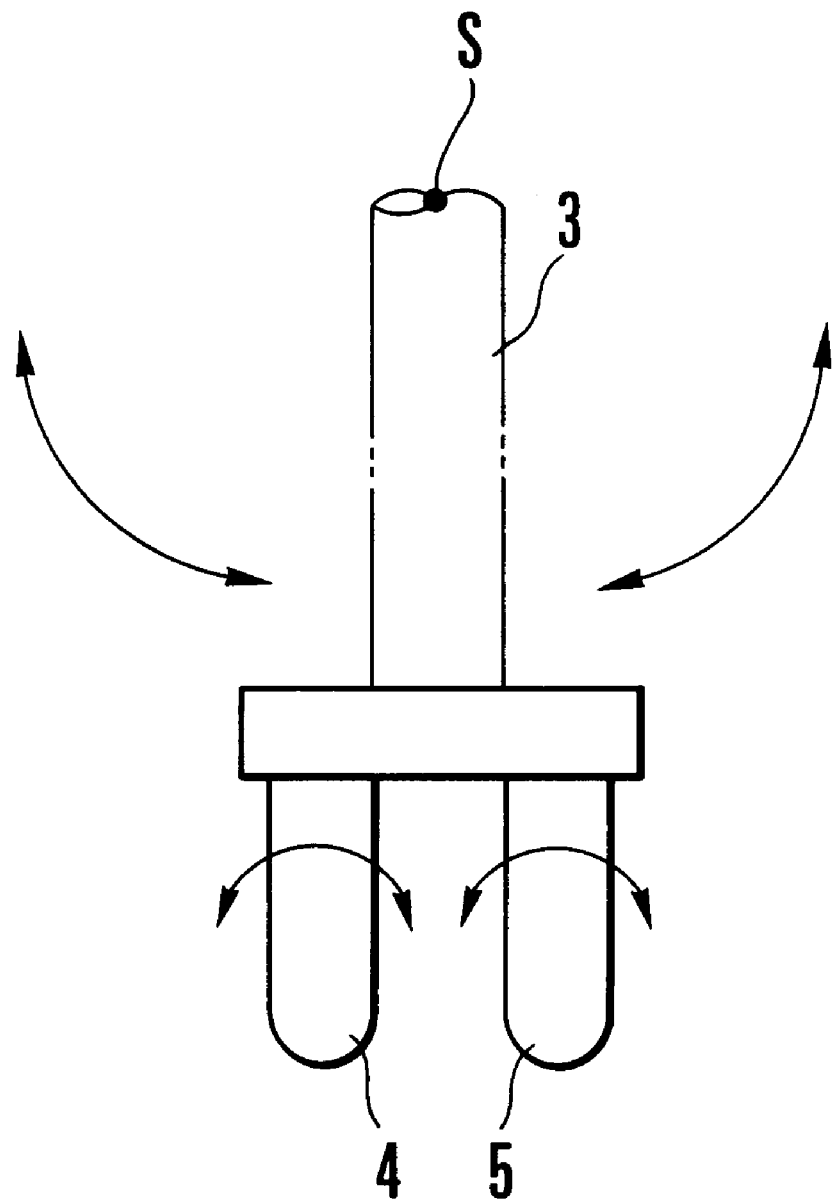
FIG. 2 is a view for explaining the operations of a main shaft 3 and footboards 4 and 5 shown in FIG. 1.

The training device 1 has a handlebar 2 the trainee grips in training, footboards 4 and 5 on which the trainee places the right and left feet, and a main shaft 3 which allows the trainee with the right and left feet placed on the footboards 4 and 5 to perform a repetitive motion. As shown in FIG. 2, the main shaft 3 can pivot in a horizontal plane about a fulcrum S. The footboards 4 and 5 can be tilted (pivot) in the right and left directions with respect to the horizontal plane. The main shaft 3 and the footboards 4 and 5 constitute the movable unit of the training device 1.

Each of the operation detection units 6 and 7 is constituted by, e.g., a rotary encoder which detects the tilt angle of the footboards 4 and 5 (tilt angle of ski edges). The operation detection unit 8 is constituted by, e.g., a rotary encoder which detects the pivot angle of the main shaft 3 (rotation (turn) angle of skis with respect to the travel direction). The load unit 9 has a brake for braking control with which braking control for the pivotal movement of the main shaft 3 is performed.

The training condition calculation unit 10 has a function of calculating training conditions for training of next time, a function of controlling the load unit 9, and a function of converting detection results from the operation detection units 6 to 8 into a format processable by the image display processing unit 12.

The image display processing unit 12 has a function of displaying, on the display unit 13, a training image which changes according to the action of the trainee in training using the training device 1 on the basis of set training conditions.

The setting unit 14 is used by the trainee to set whether the training conditions for training of next time are automatically changed.

Figure 3:
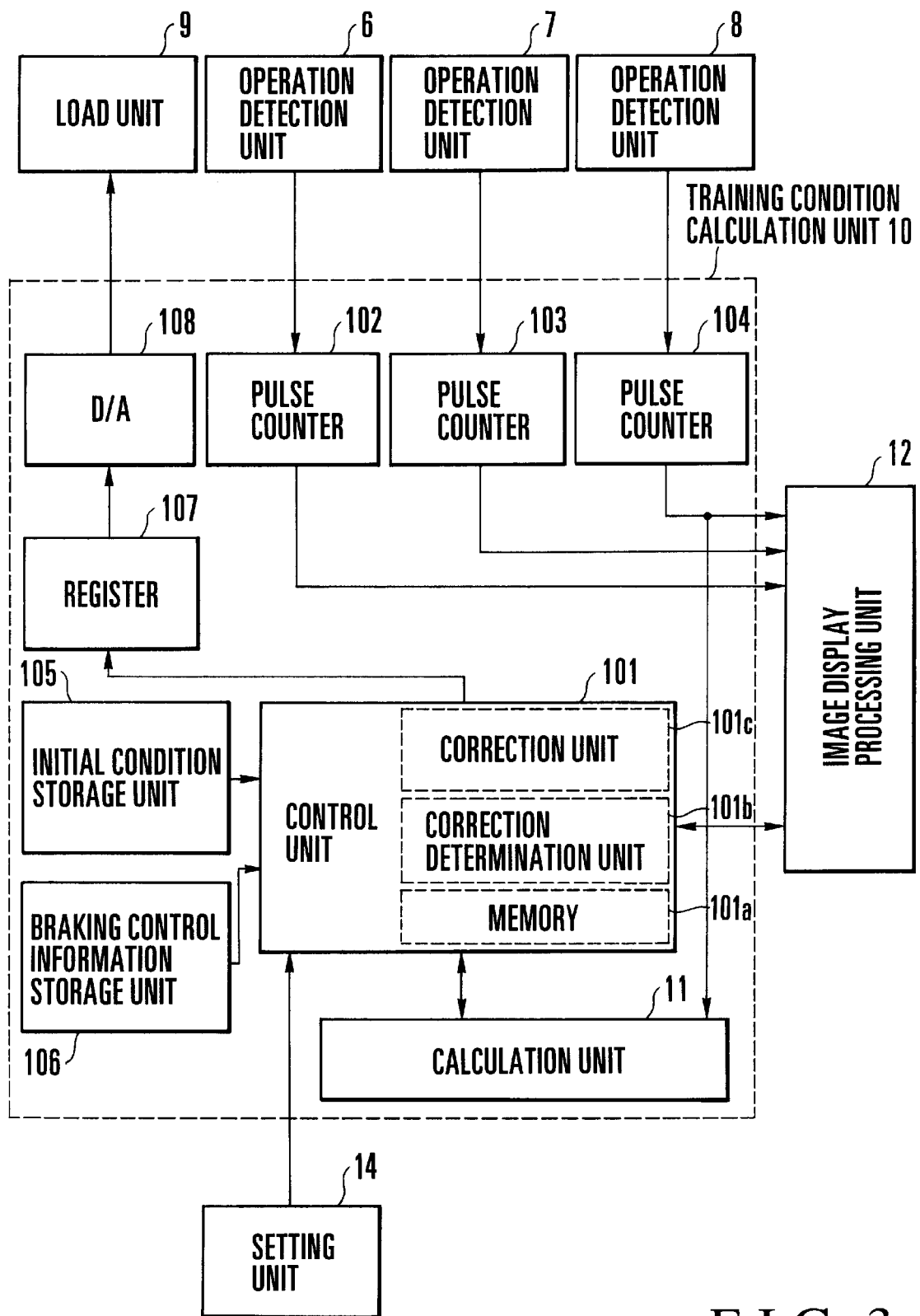
FIG. 3 is a block diagram showing the arrangement of a training condition calculation unit shown in FIG. 1.

FIG. 3 shows the arrangement of the training condition calculation unit 10. The training condition calculation unit 10 comprises a calculation unit 11 for calculating a swing count, a passed flag gate ratio, and a sliding speed, a control unit 101 having a memory 101a, a correction determination unit 101b, and a correction unit 101c, pulse counters 102 to 104, an initial condition storage unit 105 which stores conditions for an initial training course, a braking control information storage unit 106 which stores braking control information corresponding to the load set in the load unit 9, a register 107, and a D/A converter 108.

According to A- and B-phase pulses output from the operation detection unit 6 every time the footboard 4 pivots by a predetermined angle, the pulse counter 102 is incremented (if the A phase leads the B phase) or decremented (if the B phase leads the A phase) and outputs a count value corresponding to the tilt angle of the footboard 4. Similarly, according to A- and B-phase pulses output from the operation detection unit 7 every time the footboard 5 pivots by a predetermined angle, the pulse counter 103 is incremented (if the A phase leads the B phase) or decremented (if the B phase leads the A phase) and outputs a count value corresponding to the tilt angle of the footboard 5. The count values of the pulse counters 102 and 103 are initialized to zero in accordance with Z-phase pulses output from the operation detection units 6 and 7 when the tilt angles of the footboards 4 and 5 are 0°.

Figure 4:
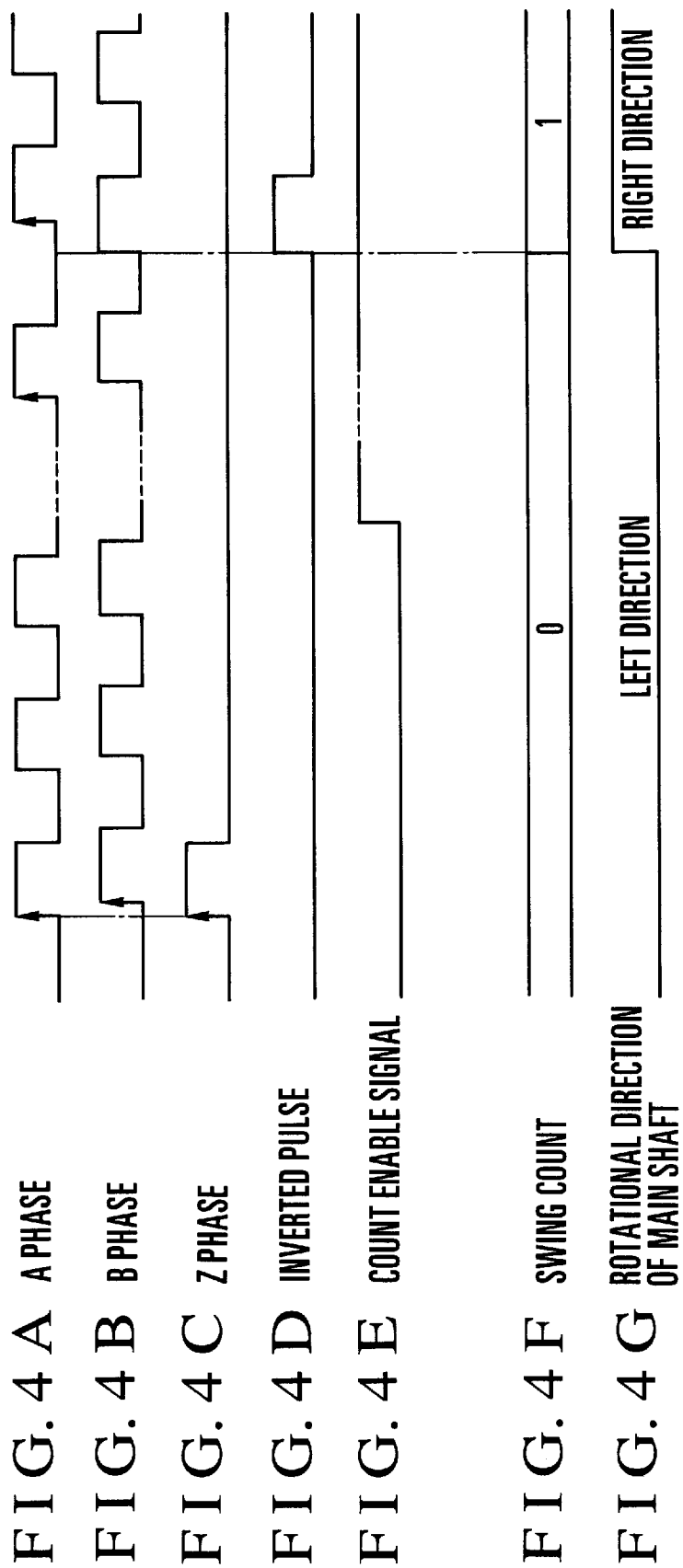
FIGS. 4A to 4G are timing charts for explaining a swing count detection operation.

The pulse counter 104 is incremented or decremented according to A- and B-phase pulses shown in FIGS. 4A and 4B, which are output from the operation detection unit 8 every time the main shaft 3 pivots by a predetermined angle, and outputs a count value corresponding to the pivot angle of the main shaft 3. The pulse counter 104 also outputs an inverted pulse to a counter circuit 113 (FIG. 6) of the calculation unit 11 (to be described later) when the phases of the A- and B-phase pulses are inverted. The count value of the pulse counter 104 is initialized to zero in accordance with a Z-phase pulse shown in FIG. 4C, which is output from the load unit 9 when the pivot angle of the main shaft 3 is 0°.

The initial condition storage unit 105 stores, as initial training conditions, a course length L of the initial training course, a flag gate interval (interval between a pair of flags constituting a flag gate) A of a flag gate set in the initial training course, and a flag gate distance (distance to the next flag gate) B of flag gates set in the initial training course. The initial condition storage unit 105 also stores an initial voltage value applied to the load unit 9 in training of the first time. This initial voltage value is stored as digital data consisting of (N+1) bits.

As shown in FIG. 5, the braking control information storage unit 106 stores different voltage values corresponding to swing counts 1 to M. Each voltage value is stored as digital data consisting of (N+1) bits. As the swing count becomes large, the corresponding voltage value, i.e., the load value set in the load unit 9 becomes large.

Figure 6:
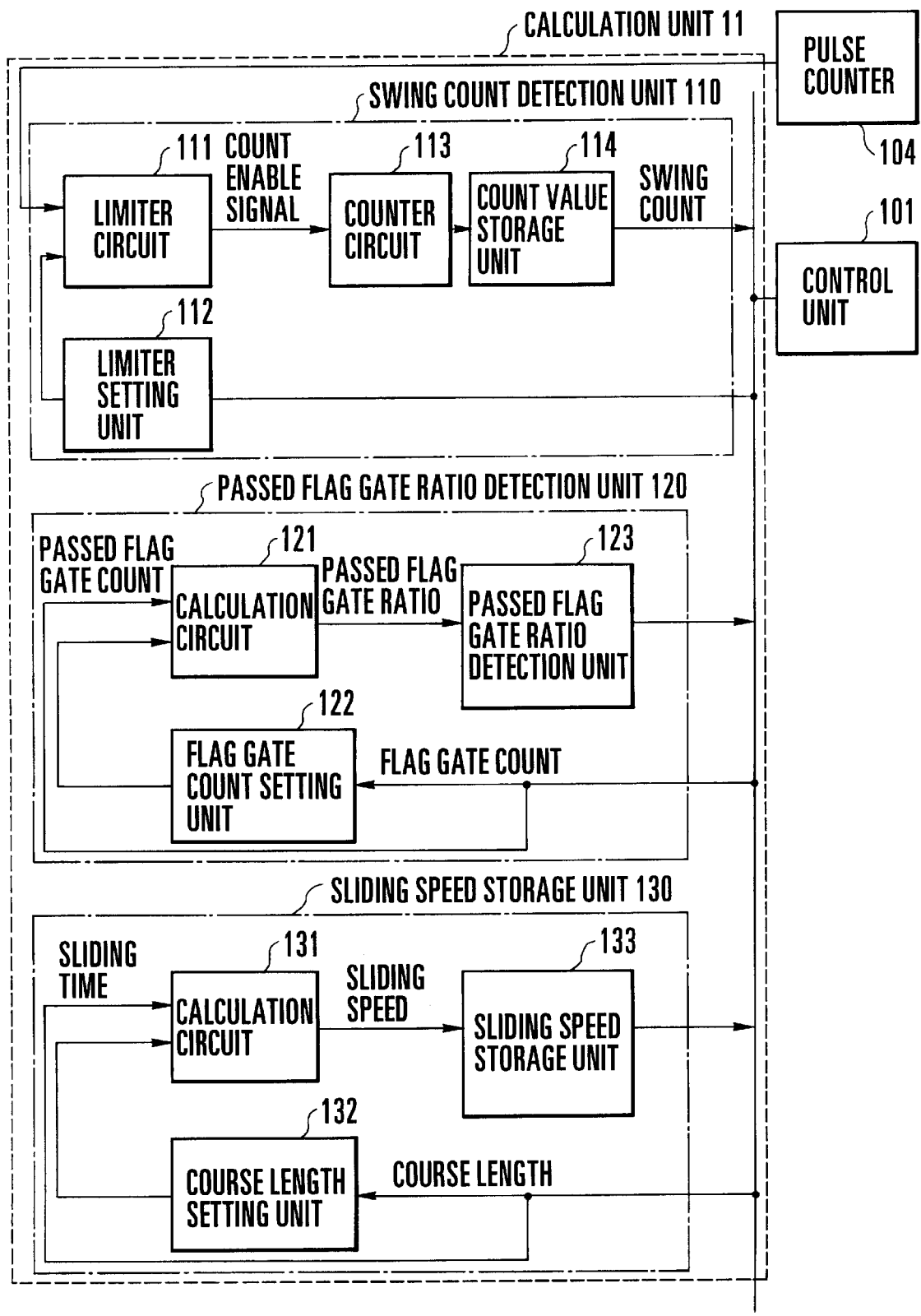
FIG. 6 is a block diagram showing the arrangement of a calculation unit shown in FIG. 3.

FIG. 6 shows the arrangement of the calculation unit 11. The calculation unit 11 comprises a swing count detection unit 110 for detecting the number of repetitive motions of the trainee, a passed flag gate ratio detection unit 120 for detecting a passed flag gate ratio, and a sliding speed detection unit 130 for detecting a sliding speed. The swing count detection unit 110 has a limiter circuit 111, a limiter setting unit 112, the counter circuit 113, and a count value storage unit 114. The passed flag gate ratio detection unit 120 has a calculation circuit 121, a flag gate count setting circuit 122, and a passed flag gate ratio storage unit 123. The sliding speed detection unit 130 has a calculation circuit 131, a course length setting unit 132, and a sliding speed storage unit 133.

The operation of the above-described training apparatus will be described next.

To perform ski training, first, the trainee sets, from the setting unit 14, whether the training conditions for training of next time are automatically changed on the basis of the result of training of this time. Next, the trainee grips the handlebar 2 of the training device 1, places the feet on the footboards 4 and 5, and thereafter, depresses a start button (not shown) arranged on the handlebar 2.

When the start button is depressed, the control unit 101 of the training condition calculation unit 10 reads out digital data representing the initial voltage value and consisting of (N+1) bits from the initial condition storage unit 105 and sets the initial voltage to the register 107. With this processing, the D/A converter 108 applies the voltage corresponding to the set initial voltage value to the load unit 9 such that a load corresponding to the initial voltage value is applied to the main shaft 3. Subsequently, the control unit 101 sets a predetermined limiter value to the limiter setting unit 112 of the calculation unit 11. The control unit 101 reads out the initial training conditions (the course length L, the flag gate interval A, and the flag gate distance B) from the initial condition storage unit 105 and outputs the conditions to the image display processing unit 12.

Upon receiving the initial training conditions, the image display processing unit 12 generates initial training course data on the basis of the given conditions. The training course data represents the positions of flags set in the training course on a U-V-H orthogonal coordinate system. The image display processing unit 12 generates the initial training course data in the following manner.

Figure 7:
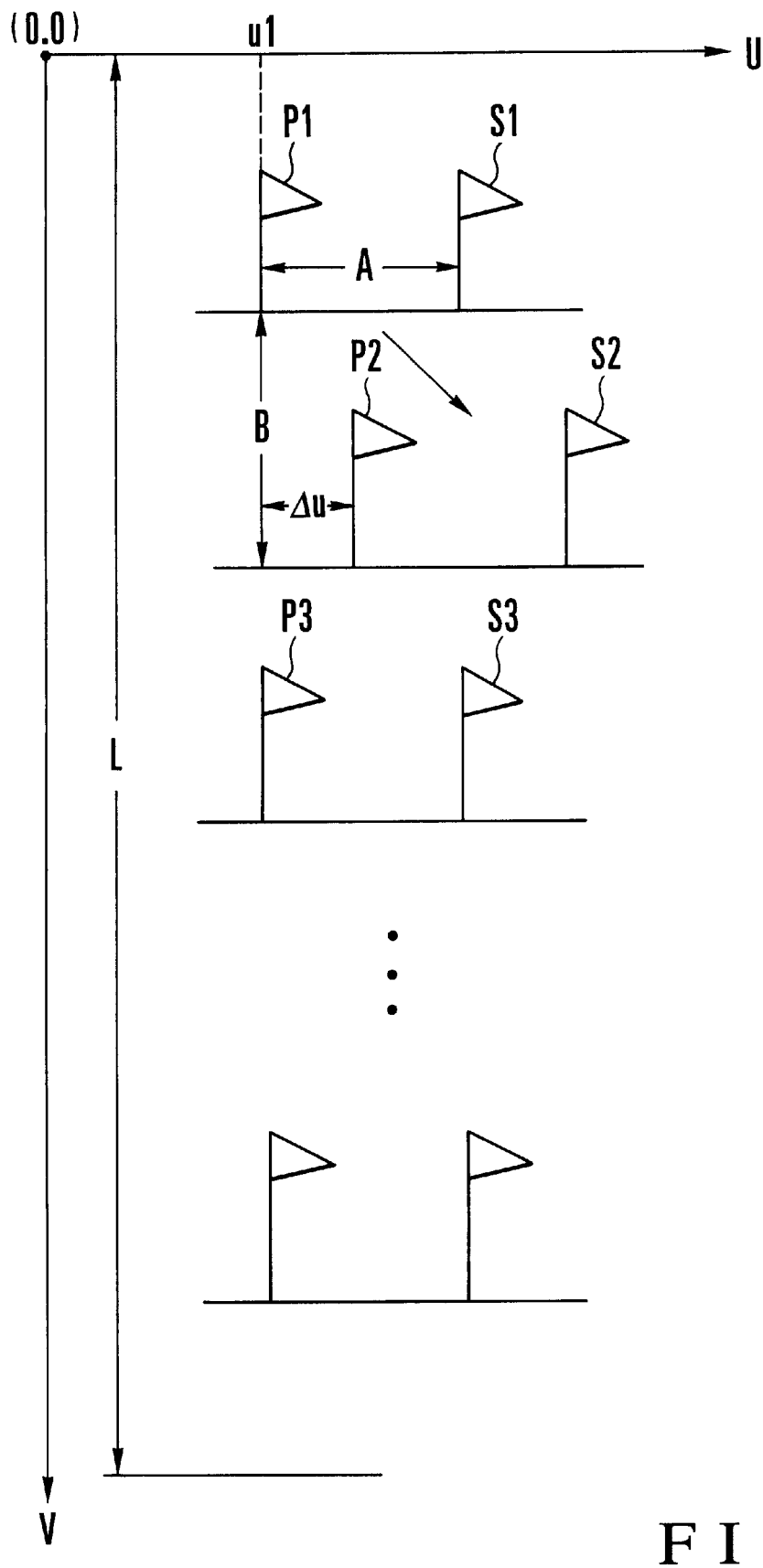
FIG. 7 is a view showing the image of an initial training course.

Upon receiving the initial training conditions (the course length L, the flag gate interval A, and the flag gate distance B), the image display processing unit 12 sets the coordinate values (U,V,H) of a flag P1 on the left side of the first flag gate shown in FIG. 7 to (u1,B,h1) where u1 is a predetermined value of the flag P1 on the left side of the first flag gate, and h1 is a value representing a predetermined sea level of the first flag gate. When the flag gate interval A is added to the U-coordinate value of the coordinate values (u1,B,h1) of the flag P1, the coordinate values (u1+A,B,h1) of a flag S1 on the right side of the first flag gate are obtained.

By adding a predetermined value Δu to the U-coordinate value, and the flag gate distance B to the V-coordinate value of the coordinate value (u1,B,h1) of the flag P1 on the left side of the first flag gate, the coordinate values (u1+Δu,2B, h2) of a flag P2 on the left side of the second flag gate are obtained, where h2 is a value representing a predetermined sea level of the second flag gate. When the flag gate interval A is added to the U-coordinate value of the coordinate values (u1+Δu,2B,h2) of the flag P2, the coordinate values (u1+Δu+A,2B,h2) of a flag S2 on the right side of the second flag gate are obtained.

When Δu is subtracted from the U-coordinate value of the coordinate values (u1+Δu,2B,h2) of the flag P2 of the second flag gate, and the flag gate distance B is added to the V-coordinate value, the coordinate values (u1,3B,h3) of a flag P3 on the left side of the third flag gate are obtained, where h3 is a value representing a predetermined sea level of the third flag gate. By adding the flag gate interval A to the U-coordinate value of the coordinate values (u1,3B,h3) of the flag P3, the coordinate values (u1+A,3B,h3) of a flag S3 on the right side of the third flag gate are obtained.

The same processing as described above is performed by the image display processing unit 12 so that initial training course data including the coordinate values of all flags set in the initial training course is generated. When the initial training course data is generated, the image display processing unit 12 generates image information for displaying an image visible when the trainee stands at the start point on the basis of the initial training course data and outputs the image information to the display unit 13. With this processing, the image visible when the trainee stands at the start point is displayed on the display unit 13.

When the training image is displayed on the display unit 13, the trainee starts ski training. At the start of ski training by the trainee, the A-, B-, and Z-phase pulses according to the training operation are output from the operation detection units 6 to 8. The pulse counters 102 and 103 output count values representing the tilt angles of the footboards 4 and 5 on the basis of the A-, B-, and Z-phase pulses output from the operation detection units 6 and 7, respectively. The pulse counter 104 outputs a count value representing the pivot angle of the main shaft 3 on the basis of the A-, B-, and Z-phase pulses output from the operation detection unit 8, and at the same time, outputs an inverted pulse shown in FIG. 4D when the pivotal direction of the main shaft 3 is reversed. More specifically, when the phase relationship between the A- and B-phase pulses shown in FIGS. 4A and 4B is reversed according to the reversal of the rotational direction of the main shaft 3 shown in FIG. 4G, the inverted pulse is output.

The image display processing unit 12 changes the image displayed on the display unit 13 on the basis of the count values output from the pulse counters 102 to 104 and the initial training course data.

Referring to FIG. 6, the limiter circuit 111 of the swing count detection unit 110 compares a limiter value set in the limiter setting unit 112 and the absolute value of the count value supplied from the pulse counter 104 and sets a count enable signal to logic "1", as shown in FIG. 4E, while the counter value is larger than the limiter value.

Only when the inverted pulse is output from the pulse counter 104 for the count enable signal of "1", the counter circuit 113 increments a count value held in the count value storage unit 114 and representing the swing count M by one, as shown in FIG. 4F. More specifically, even when the rotational direction of the skis is reversed, the swing count detection unit 110 does not regard that the repetitive operation is performed as far as the rotation angle of the skis is smaller than an angle corresponding to the limiter value set in the limiter setting unit 112. Only when the rotation angle of the skis is equal to or larger than the angle corresponding to the limiter value set in the limiter setting unit 112, and the rotational direction of the skis is reversed, the swing count detection unit 110 regards that the repetitive operation is performed.

Upon completion of training with the initial training course, the control unit 101 of the training condition calculation unit 10 refers to the setting unit 14 and determines whether a change in training conditions for training of next time is designated. If a change in training conditions is not designated, processing waits until the start button or end button arranged on the handlebar 2 of the training device 1 is depressed. When the start button is depressed, the same processing as described above is performed to display the initial training course on the display unit 13. When the end button is depressed, processing for training is ended.

If the control unit 101 determines with reference to the setting unit 14 that a change in training conditions for training of next time is designated, the control unit 101 requests the image display processing unit 12 of a passed flag gate count X, a sliding time T, a flag gate count N, and the course length L in training of this time. The image display processing unit 12 counts and holds the passed flag gate count on the basis of the count values from the pulse counters 102 to 104 and the training course data and also measures the sliding time T from the start to the goal.

Upon receiving the above information from the image display processing unit 12, the control unit 101 sets the flag gate count N and the course length L to the flag gate count setting circuit 122 of the passed flag gate ratio detection unit 120 and the course length setting unit 132 of the sliding speed detection unit 130 shown in FIG. 6, respectively. Next, the control unit 101 supplies the passed flag gate count X and the sliding time T to the calculation circuit 121 of the passed flag gate ratio detection unit 120 and the calculation circuit 131 of the sliding speed detection unit 130, respectively.

Upon receiving the passed flag gate count X, the calculation circuit 121 divides the passed flag gate count X by the flag gate count N set in the flag gate count setting circuit 122 to obtain a passed flag gate ratio D and stores the obtained passed flag gate ratio D in the passed flag gate ratio storage unit 123. Upon receiving the sliding time T, the calculation circuit 131 divides the course length L set in the course length setting unit 132 by the sliding time T to obtain a sliding speed V and stores the obtained sliding speed V in the sliding speed storage unit 133.

Thereafter, the control unit 101 calculates equation (1) below by using the passed flag gate ratio D in training of this time, which is stored in the passed flag gate ratio storage unit 123, thereby obtaining a course length Q for training of next time:

$$l = L(0.5 + D) \quad (1)$$

If the passed flag gate ratio D in training of this time is as high as, e.g., 1, the course length for training of next time is obtained as 1.5L on the basis of equation (1). The course length is larger than the course length L in training of this time. That is, the training course for training of next time is harder than that in training of this time. If the passed flag gate ratio D in training of this time is as low as, e.g., 0, the course length Q for training of next time is 0.5L. The course length Q is smaller than the course length L in training of this time. That is, the training course for training of next time becomes easier than that in training of this time.

The correction determination unit 101b of the control unit 101 determines whether the course length l obtained in the above manner need be corrected on the basis of the swing count M in training of this time stored in the count value storage unit 114, the flag gate count N in training of this time, the sliding speed V in training of this time stored in the sliding speed storage unit 133, and a sliding speed V' in the previous training held in the memory 101a of the control unit 101. More specifically, when conditions M≧N and V'<V are satisfied, or when conditions M<N and V'>V are satisfied, it is determined that the obtained course length L need be corrected. Otherwise, it is determined that the obtained course length need not be corrected. If training of this time is training of the first time, a predetermined speed held in the memory 101a is used as the sliding speed V' in the previous training.

If it is determined that the course length need not be corrected, the control unit 101 sets the course length l obtained in the above manner as the course length l for training of next time. If it is determined that the course length need be corrected, the correction unit 101c of the control unit 101 obtains a correction coefficient S represented by equation (2):

$$S = V/V' \quad (2)$$

The course length l obtained using equation (1) is multiplied by the correction coefficient S represented by equation (2) above, and the product is set as the course length Q for training of next time. More specifically, when the conditions M≧N and V'<V are satisfied, it is determined that the training condition of the course length l before correction is too easy for the trainee, so that correction is performed to increase the course length. When the conditions M<N and V'>V are satisfied, it is determined that the training condition of the course length l before correction is too hard for the trainee, so that correction is performed to reduce the course length.

After the course length l for training of next time is obtained, the control unit 101 calculates equation (3) below by using the passed flag gate ratio D in training of this time, which is stored in the passed flag gate ratio storage unit 123, thereby obtaining a flag gate interval a for training of next time:

$$a = A(1.5 - D) \quad (3)$$

If the passed flag gate ratio D in training of this time is as high as, e.g., 1, the flag gate interval a for training of next time is obtained as 0.5A on the basis of equation (3). The flag gate interval is smaller than the flag gate interval A in training of this time. If the passed flag gate ratio D in training of this time is as low as, e.g., 0, the flag gate interval a for training of next time is 1.5A. The flag gate interval is larger than the flag gate interval A in training of this time.

The correction determination unit 101b of the control unit 101 determines on the basis of the swing count M in training of this time stored in the count value storage unit 114, the flag gate count N in training of this time, the sliding speed V in training of this time stored in the sliding speed storage unit 133, and the sliding speed V' in the previous training held in the memory 101a of the control unit 101 whether the obtained flag gate interval a need be corrected, as in the case of the course length l. More specifically, when the conditions M≧N and V'<V are satisfied, or when conditions M<N and V'>V are satisfied, it is determined that the obtained flag gate interval a need be corrected. Otherwise, it is determined that the obtained flag gate interval a need not be corrected. If training of this time is training of the first time, a predetermined speed held in the memory 101a is used as the sliding speed V' in the previous training.

If it is determined that the flag gate interval need not be corrected, the flag gate interval a obtained in the above manner serves as the flag gate interval a for training of next time. If it is determined that the flag gate interval need be corrected, the correction unit 101c of the control unit 101 divides the flag gate interval a obtained using equation (3) by the correction coefficient S represented by equation (2), and the quotient is set as the flag gate interval a for training of next time. More specifically, when the conditions M≧N and V'<V are satisfied, it is determined that the training condition of the flag gate interval a before correction is too easy for the trainee, so that correction is performed to decrease the flag gate interval. When the conditions M<N and V>V' are satisfied, it is determined that the training condition of the flag gate interval a before correction is too hard for the trainee, so that correction is performed to increase the flag gate interval a.

After the flag gate interval a for training of next time is obtained, the control unit 101 calculates equation (4) below by using the passed flag gate ratio D in training of this time, which is stored in the passed flag gate ratio storage unit 123, thereby obtaining a flag gate distance b:

$$b = B(1.5 - D) \quad (4)$$

If the passed flag gate ratio D in training of this time is as high as, e.g., 1, the flag gate distance b for training of next time is obtained as 0.5B on the basis of equation (4). The flag gate distance is smaller than the flag gate distance B in training of this time. If the passed flag gate ratio D in training of this time is as low as, e.g., 0, the flag gate distance b for training of next time is 1.5A. The flag gate distance is larger than the flag gate distance B in training of this time.

The correction determination unit 101b of the control unit 101 determines on the basis of the swing count M in training of this time stored in the count value storage unit 114, the flag gate count N in training of this time, the sliding speed V in training of this time stored in the sliding speed storage unit 133, and the sliding speed V' in the previous training held in the memory 101a of the control unit 101 whether the obtained flag gate distance b need be corrected, as in the cases of the course length l and flag gate interval a. More specifically, when the conditions M≧N and V'<V are satisfied, or when conditions M<N and V'>V are satisfied, it is determined that the obtained flag gate distance b need be corrected. Otherwise, it is determined that the obtained flag gate distance b need not be corrected. If training of this time is training of the first time, a predetermined speed held in the memory 101a is used as the sliding speed V' in the previous training.

If it is determined that the flag gate distance need not be corrected, the flag gate distance b obtained in the above manner serves as the flag gate distance b for training of next time. If it is determined that the flag gate distance need be corrected, the correction unit 101c of the control unit 101 divides the flag gate distance b obtained using equation (4) by the correction coefficient S represented by equation (2), and the quotient is set as the flag gate distance b for training of next time. More specifically, when the conditions M≧N and V'<V are satisfied, it is determined that the training condition of the flag gate distance b before correction is too easy for the trainee, so that correction is performed to decrease the flag gate distance. When the conditions M<N and V>V' are satisfied, it is determined that the training condition of the flag gate distance b before correction is too hard for the trainee, so that correction is performed to increase the flag gate distance b.

Figure 8:
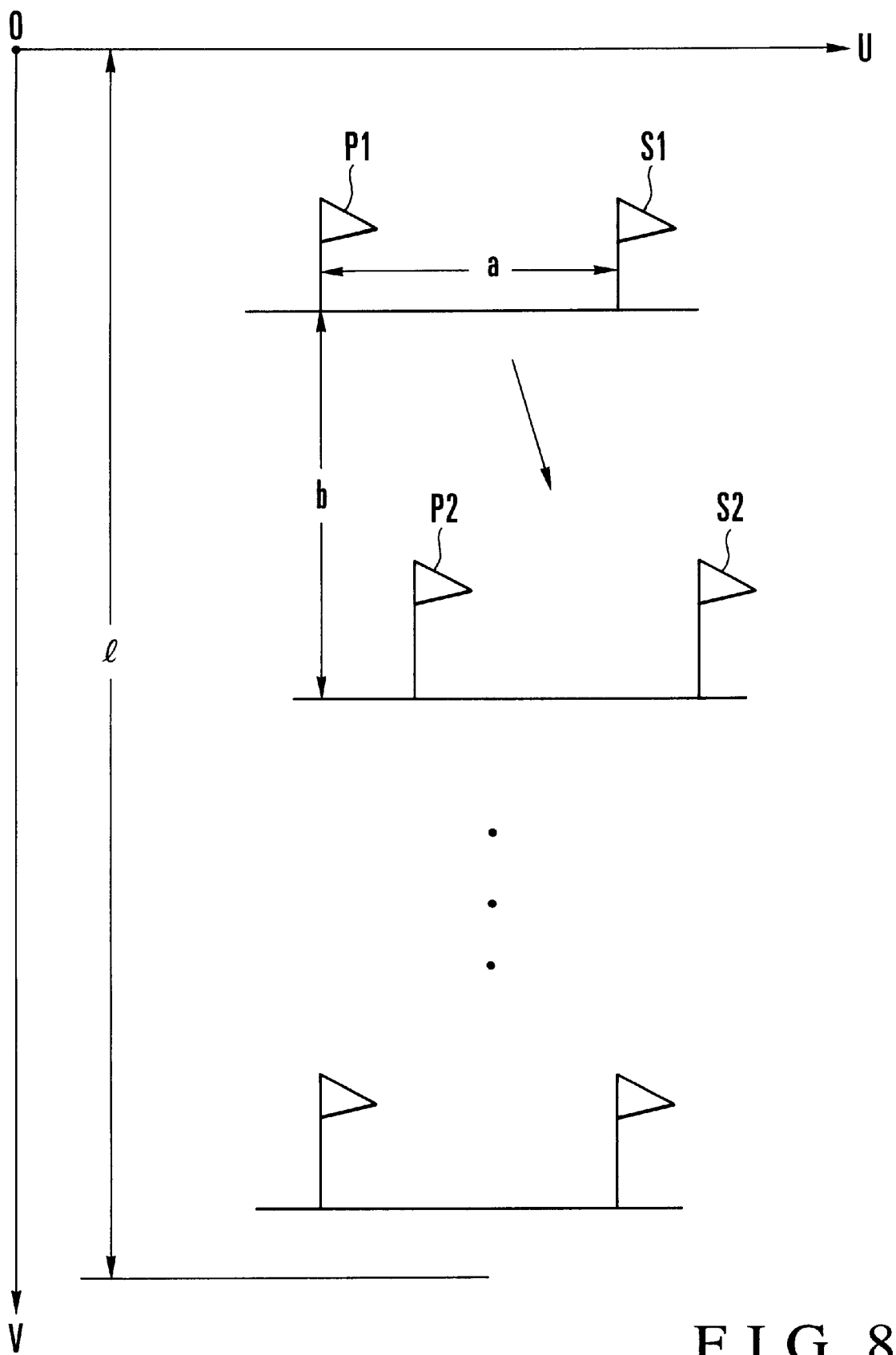
FIG. 8 is a view showing the image of a training course after the change in training conditions.
Figure 9:
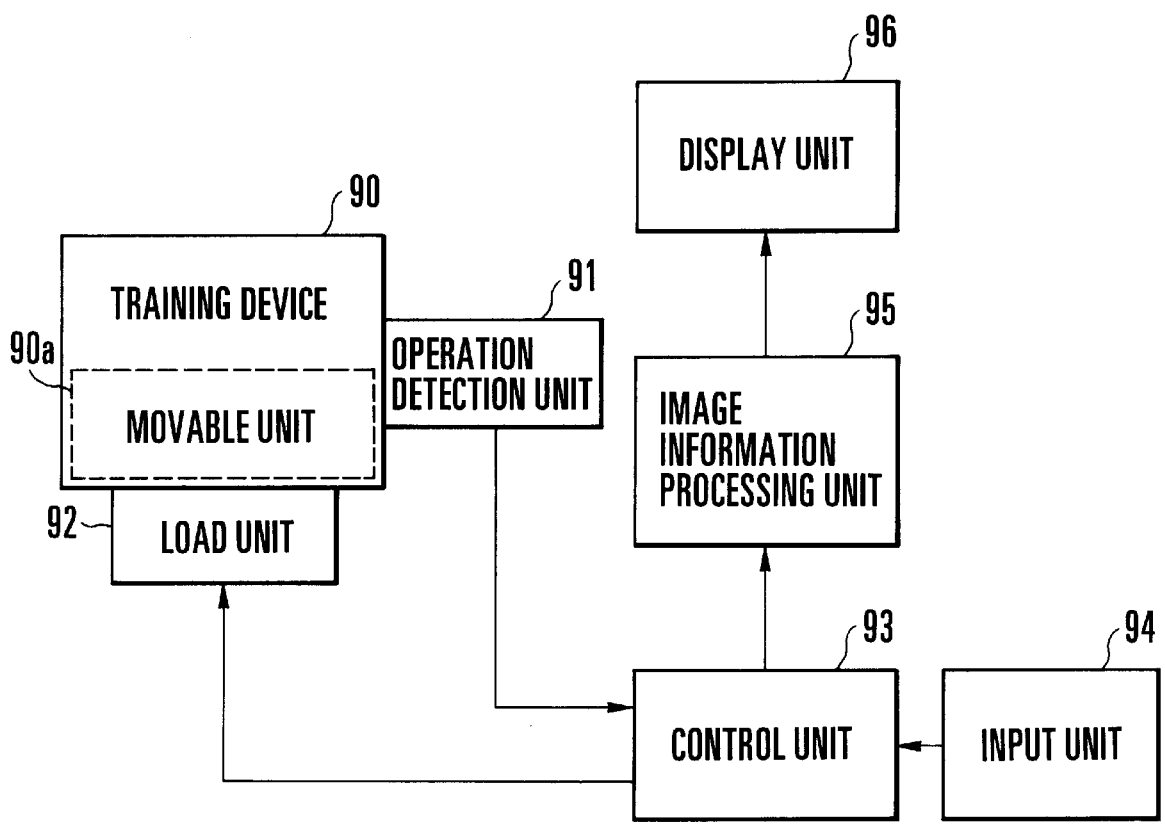
FIG. 9 is a block diagram showing a conventional training apparatus.

FIG. 8 shows the image of a training course which is displayed in training of next time when the passed flag gate ratio D in training of next time is smaller than 0.5. The course length l is smaller and the flag gate interval a and the flag gate distance b are larger than those of the initial training course shown in FIG. 7.

When the training conditions (the course length l, the flag gate interval a, and the flag gate distance b) for training of next time are obtained, the control unit 101 waits until the start button or end button arranged on the handlebar 2 of the training device 1 is depressed. If the trainee depresses the end button to end training, the control unit 101 ends processing. If the trainee depresses the start button to perform training under the training conditions of next time, the control unit 101 performs the following processing.

When the start button is depressed, the control unit 101 reads out the swing count M stored in the count value storage unit 114. Next, the control unit 101 reads out a voltage value corresponding to the readout swing count M from voltage values stored in the braking control information storage unit 106 as digital data consisting of (N+1) bits, and sets the readout voltage value to the register 107. The D/A converter 108 applies a voltage corresponding to the voltage value set in the register 107 to the load unit 9 such that a load corresponding to the set voltage value is applied to the main shaft 3. As for voltage values stored in the braking control information storage unit 106, the voltage value becomes large as the swing count M becomes large. For this reason, as the swing count M in training of this time is large, the voltage applied to the load unit 9 becomes high, and the load applied to the main shaft 3 increases. That is, the load applied in training becomes large as the capacity for locomotion and technique of the trainee become high.

The control unit 101 outputs the training conditions (the course length l, the flag gate interval a, and the flag gate distance b) for training of next time, which are obtained in the above-described manner, to the image display processing unit 12. Upon receiving the training conditions from the control unit 101, the image display processing unit 12 performs the same processing as described above and displays a training course corresponding to the supplied training conditions on the display unit 13.

In the above-described embodiment, the training apparatus has been described as a ski training apparatus. However, the present invention can be applied to a training apparatus of another type, as a matter of course.

As has been described above, according to the present invention, the training condition calculation unit calculates training conditions for training of next time on the basis of the detection result from the operation detection unit and the training image data (course data) in training of this time. In training of next time, the image display processing unit displays, on the display unit, a training image corresponding to the training conditions obtained by the training condition calculation unit. With this arrangement, training can be performed under training conditions corresponding to the capacity for locomotion and technique of the trainee.

The training condition calculation unit calculates a load to be applied to the load unit in training of next time in accordance with the detection result from the operation detection unit in training of this time. Control is performed such that the obtained load is applied to the movable unit of the training device in training of next time. Therefore, training can be performed under training conditions corresponding to the capacity for locomotion and technique of the trainee.

What is claimed is:

1. A ski training apparatus comprising:
   a ski training device having movable means which movable means is displaced according to an action of a trainee who is training with reference to a training image, said movable means comprising a pair of footboards which support feet of the trainee and are tiltable in right and left directions, and a main shaft for pivoting said footboards in a horizontal plane about a fulcrum;
   operation detection means for detecting a displacement of said movable means during current training;
   training condition calculation means for calculating a next-time training condition on the basis of a detection result from said operation detection means from the current training and a training condition beginning the current training, said training condition comprising a course length, a flag gate interval, and a flag gate distance;
   image display processing means for preparing, on the basis of the training condition obtained by said training condition calculation means, training image data which changes according to the detection result from said operation detection means in training under the obtained training condition, said image display processing means preparing the training image data in accordance with given course length, flag gate interval, and flag gate distance; and
   display means for displaying the training image in accordance with the training image data prepared by said image display processing means.

2. The apparatus of claim 1, further comprising:
   a first calculation means for calculating a passed flag gate ratio by using a passed flag gate count and a flag gate count in the current training, which are obtained from said image display processing means,
   wherein said training condition calculation means calculates a course length, flag gate interval, and next-time flag gate distance on the basis of the passed flag gate ratio obtained by said first calculation means.

3. The apparatus of claim 2, further comprising:
   a second calculation means for calculating a swing count on the basis of the detection result from said operation detection means; and
   a third calculation means for calculating a sliding speed by using a sliding speed and course length in the current training, which are obtained from said image display processing means,
   wherein whether correction of the course length, flag gate interval, and next-time flag gate distance which are calculated on the basis of the passed flag gate ratio is necessary is determined on the basis of the swing count in training immediately before which is obtained by said second calculation means, a flag gate count in training immediately before which is obtained from said image display processing means, a sliding speed in training immediately before which is obtained by said third calculation means, and a sliding speed in training two times before which is obtained by said third calculation means.

4. The apparatus of claim 3, wherein, when it is determined that correction is necessary, the course length, flag gate interval, and next-time flag gate distance which are calculated on the basis of the passed flag gate ratio are corrected on the basis of a ratio of the sliding speed in the current training which is obtained by said third calculation means to the sliding speed in second preceding training which is obtained by said third calculation means.

5. A training apparatus comprising:
  a session activation means so that a trainee can begin and terminate a training session;
  a movable means which is displaced by actions of the trainee during training;
  an operation detection means for detecting said displacement of said movable means during a training session;
  training condition calculation means for calculating a next-time training condition on the basis of: (i) a detection result from said operation detection means during a current training session and (ii) a previous training condition stored in said training condition calculation means, said previous training condition having been stored at the completion of a previous training session responsive to the trainee terminating the previous training session;
  image display processing means for preparing, on the basis of said previous training condition obtained by said training condition calculation means upon the trainee beginning the present training session, training image data which changes according to the detection result from said operation detection means in training under the obtained training conditions; and
  display means for displaying the training image in accordance with the training image data prepared by said image display processing means.

6. The apparatus of claim 5, further comprising load means for applying a load to said movable means during training,
  wherein said training condition calculation means determines load data for next-time training, upon beginning of a training session, on the basis of the detection result from said operation detection means in an immediately preceding training session.

7. The apparatus of claim 6, further comprising load data storage means for storing the load data in correspondence with an output from said operation detection means,
  wherein said training condition calculation means reads out the load data for next-time training control of said movable means from said load data storage means by using the detection result from said operation detection means in the immediately preceding training session.

8. The apparatus of claim 5, further comprising a setting means for, upon beginning a training session, optionally selecting an automatically-changed training condition,
  wherein, upon said setting means being set to select an automatically-changed training condition, said training condition calculation means calculates the next-time training condition and outputs the next-time training condition to said image display processing means.

9. The apparatus of claim 8, wherein, upon said setting means being set not to select an automatically-changed training condition, said training condition calculation means controls said image display processing means on the basis of the immediately preceding training condition.

10. The apparatus of claim 5, wherein said training condition calculation means calculates the next-time training condition on the basis of a training achieving ratio obtained from the detection result from said operation detection means in the immediately preceding training session and the immediately preceding training condition.

11. The apparatus of claim 10, wherein said training condition calculation means comprises:
  correction determination means for determining, on the basis of the detection result from said operation detection means, whether the next-time training condition obtained on the basis of the training achieving ratio, need be corrected; and
  correction means for calculating a correction coefficient on the basis of a training result obtained from a detection result from said image display control means when a determination result from said correction determination means indicates a necessity for correction, and correcting the training condition obtained on the basis of the training achieving ratio, in accordance with the obtained correction coefficient.

12. The apparatus of claim 5, further comprising initial condition storage means for storing an initial training condition,
  wherein, in an initial training session, said image display processing means generates first training image data in accordance with the initial training condition read out from said initial condition storage means.

13. The apparatus of claim 5, wherein said movable means further comprises a pair of footboards which support feet of the trainee and independently pivot about a first and second axes, and a main shaft connecting said footboards by a length of said shaft to a pivoting point so that said footboards pivot about an arc whose radius of rotation is defined by said shaft length.

14. The apparatus of claim 13, wherein the training condition consists of a course length, a flag gate interval, and a flag gate distance, and said image display processing means prepares the training image data in accordance with given course length, flag gate interval, and flag gate distance.

15. The apparatus of claim 14, further comprising first calculation means for calculating a passed flag gate ratio by using a passed flag gate count and a flag gate count in the immediately preceding training session, which are obtained from said image display processing means, and wherein said training condition calculation means calculates a course length, flag gate interval, and flag gate distance of next time on the basis of the passed flag gate ratio obtained by said first calculation means.

16. The apparatus of claim 15, further comprising:
  second calculation means for calculating a swing count on the basis of the detection result from said operation detection means; and
  third calculation means for calculating a sliding speed by using a sliding speed and course length in the immediately preceding training session, which are obtained from said image display processing means, and
  wherein whether correction of the course length, flag gate interval, and next-time flag gate distance which are calculated on the basis of the passed flag gate ratio is necessary is determined on the basis of the swing count in the immediately preceding training session which is obtained by said second calculation means, a flag gate count in the immediately preceding raining session which is obtained from said image display processing means, a sliding speed in the immediately preceding training session which is obtained by said third calculation means, and a sliding speed in a twice-earlier training session which is obtained by said third calculation means.

17. The apparatus of claim 16, wherein when it is determined that correction is necessary, the next-time course length, flag gate interval, and flag gate distance, which are calculated on the basis of the passed flag gate ratio, are corrected on the basis of a ratio of the sliding speed in the immediately preceding training session which is obtained by said third calculation means to the sliding speed in the twice-earlier training session which is obtained by said third calculation means.

18. The apparatus of claim 15, wherein said operation detection means detects pivot amounts of said footboards and said main shaft and outputs the pivot amounts to said training condition calculation means.

* * * * *